United States Patent [19]
Elkern

[11] 3,920,552
[45] Nov. 18, 1975

[54] SELF-CONTAINED WATER TREATMENT SYSTEM

[75] Inventor: Kenneth F. Elkern, South Chicago Heights, Ill.

[73] Assignees: Kenneth F. Elkern, Jr.; Pamela K. Elkern, both of South Chicago Heights, Ill.

[22] Filed: June 28, 1973

[21] Appl. No.: 374,325

[52] U.S. Cl. ............... 210/141; 210/205; 210/220; 210/241; 259/4; 261/123
[51] Int. Cl.² ..... B01F 3/04; C02B 3/08; C02C 5/04
[58] Field of Search .......................... 210/141–143, 210/167, 169, 170, 199, 241, 205, 209, 220; 261/36 R, 75, 93, 123, DIG. 26, DIG. 75, 121 R; 259/4, 16, 36

[56] References Cited
UNITED STATES PATENTS

| | | | |
|---|---|---|---|
| 2,706,870 | 4/1955 | Stogner ...................... | 261/121 R X |
| 2,761,239 | 9/1956 | Stamps ....................... | 261/121 R X |
| 2,988,343 | 6/1961 | Edwards et al. ............. | 261/DIG. 26 |
| 3,083,148 | 3/1963 | Mojonnier ................... | 261/123 X |
| 3,119,704 | 1/1964 | Harrell et al. ............... | 261/75 X |
| 3,262,571 | 7/1966 | Petretti ...................... | 210/241 X |
| 3,385,480 | 5/1968 | Tidwell ....................... | 261/36 R |
| 3,450,265 | 6/1969 | Kreusch et al. ............. | 210/142 X |
| 3,450,266 | 6/1969 | Allen ........................... | 210/167 |
| 3,470,091 | 9/1969 | Budd et al. .................. | 210/170 X |
| 3,662,890 | 5/1972 | Grimshaw ................... | 261/DIG. 75 |
| 3,755,142 | 8/1973 | Whipple, Jr. ................ | 261/93 X |
| 3,759,669 | 9/1973 | Aaron et al. ................ | 261/123 X |
| 3,767,051 | 10/1973 | Thompson .................. | 210/221 X |
| 3,778,976 | 12/1973 | Pond .......................... | 210/169 X |

*Primary Examiner*—Samih N. Zaharna
*Assistant Examiner*—Robert H. Spitzer
*Attorney, Agent, or Firm*—Alter and Weiss

[57] ABSTRACT

A water treatment system comprises a mixing tank having means for drawing ambient water from a nearby lake, stream, or river for selectively introducing air or chemicals into the water and for thoroughly mixing the water and any air or chemicals so introduced, to thereby treat the water. The treated water is then returned to the ambient water where it is thoroughly mixed therewith by means of a turbine mounted at the end of a conduit.

7 Claims, 5 Drawing Figures

SELF-CONTAINED WATER TREATMENT SYSTEM

This invention relates to water treatment systems and more particularly to self-contained systems for aerating or chemically treating water.

At the moment, water pollution is a very pressing worldwide problem. The water of many lakes, streams, ponds, rivers, other ambient water sources, and the like, have become polluted among other things by a depletion of oxygen to an extent that animal life cannot be supported in it. The absence of animal life breaks the biological cycle, and plant life soon suffers also. Algae and similar undesirable plant life grows unchecked until the lake water cannot support any form of life.

For rehabilitation, this depressing loss of valuable water resources often requires a number of different forms of water treatments. Sometimes, the treatment is to bubble air through the lake water to replace the depleted life-supporting gases. Sometimes, the treatment is to introduce any of many different kinds of chemicals or gases. Some of these chemicals or gases may be in the nature of herbicides for selectively eliminating the more undesirable weeds, algae, or the like. Other of these chemicals may be in the nature of medicine for plant or fish. Still other of the chemicals may comprise means for selectively eliminating fungi, parasites, flukes, and the like.

The inventive system structure for performing these and other treatments involves chemical handling equipment, blowers, pumps, suction hoses and the like. Preferably, they should be self-contained, easily transported and used, without requiring substantial installation costs. They should also be flexible in their use so that they have a maximum amount of utility under a variety of environmental conditions.

Accordingly, an object of this invention is to provide new and improved water treatment equipment. Here an object is to provide equipment which is selectively useful for both aerating and chemically treating water. More particularly, an object is to draw off ambient lake water, mix it well with chemicals, and then release it into the ambient lake or stream surroundings.

Another object of the invention is to provide a completely self-contained water treatment unit which may be transported and put into use with virtually no installation required. In particular, an object is to provide a flexible truck mounted unit having many different and alternative uses. In this connection, an object is to provide a truck having water treating equipment mounted thereon, which truck may be driven to a selected lake site and there used to treat the local water.

Another object of the invention is to provide a method of and process for water treatment which is useful in lake or stream.

In keeping with an aspect of the invention these and other objects are accomplished by self-contained equipment permanently mounted on the body of a truck, semi-trailer, or trailer. The truck or trailer is driven to a lake or stream site where hoses are laid between it and the water. Then water is sucked from the lake, processed, and returned to the lake. The returned water is fed through a pipe or shroud extending from the surface to the lake bottom or into deep water. There, a freely rotating turbine mixes the processed water with ambient surrounding water.

The nature of a preferred embodiment for accomplishing the foregoing objects will become more apparent from a study of the following specifications and the attached drawings wherein.

Figure 1:
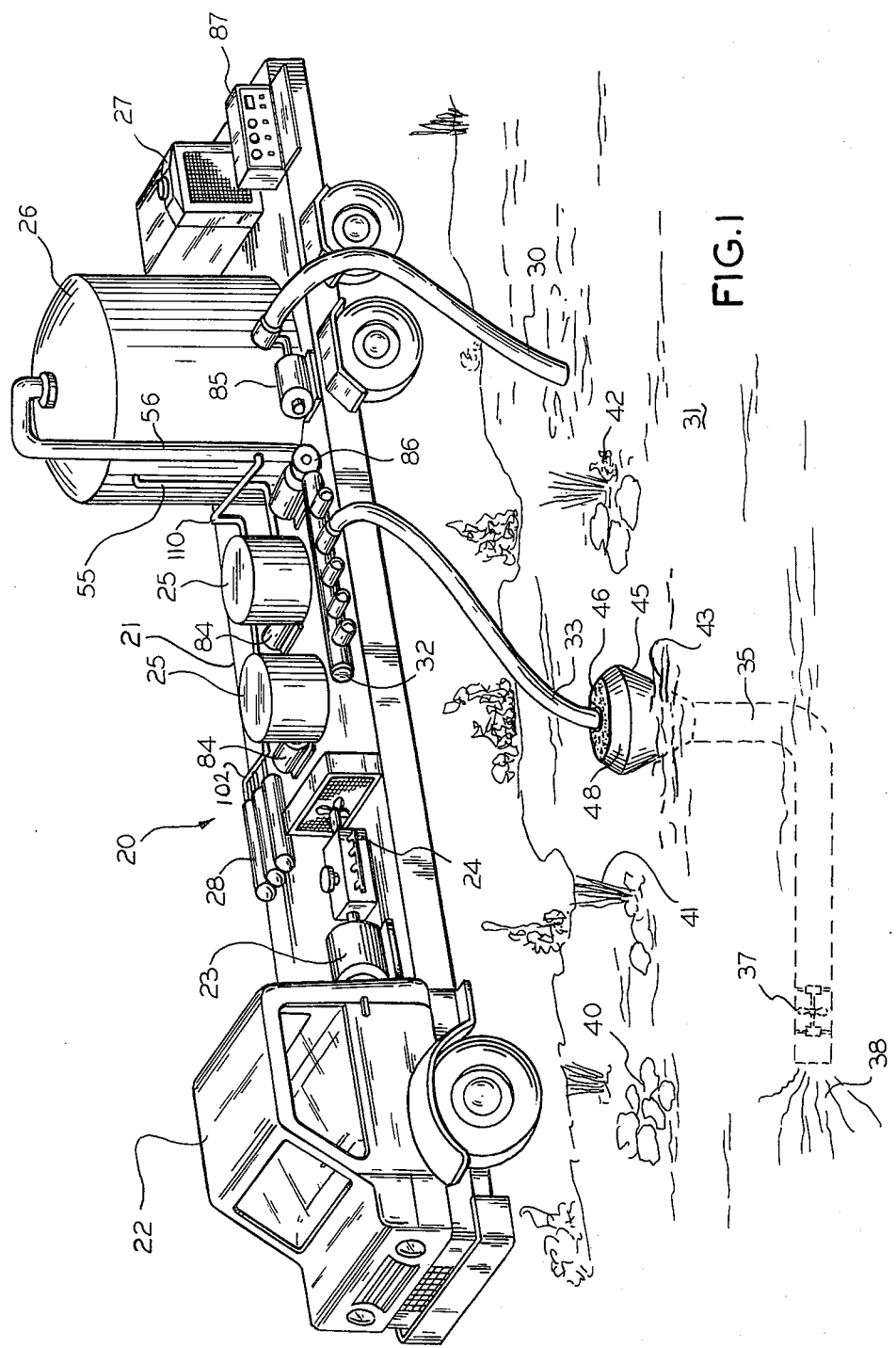
FIG. 1 is a perspective view of a preferred embodiment of equipment for treating ambient water in a nearby lake.

In general, the major equipments used by the invention are seen in FIG. 1 wherein a self-contained water treatment system 20 is mounted on the body 21 of a truck 22. This water treatment equipment comprises an electrical generator 23 driven by a diesel engine 24, any suitable number of chemical mixing tanks 25, a pressurized water mixing tank 26, an air compressor 27, and gas tanks 28 (containing ozone, for example).

The input for the water treatment system is provided by a hose 30 extending from mixing tank 26 into a nearby source of ambient water, such as a lake 31. The output of the water treatment system is taken from a manifold 32. As here shown, this manifold may provide for connections of any number, up to five, of separate outlet hoses; however, this number is not critical. By way of example, one of the manifold outlets is here shown as being connected to a hose 33.

At the other end of hose 33, an outlet mixer comprises a relatively stable conduit 35 extending from the surface of lake 31 down into the bottom regions of the lake. This conduit 35 may be made of any suitable material which may be permanently, semi-permanently, or temporarily sunk to any suitable depth into the lake 31. In one case, it might be a galvanized iron pipe permanently set in cement. In another case, it might be a fiber-glass tube, or the like, which might be hauled on the truck 22.

The lower end of the conduit 35 includes a freely turning turbine 37 which is rotated by a stream of treated water flowing through the manifold 32, hose 33, and conduit 35. As the turbine 37 so rotates, it mixes the treated water in the hose 33 with the ambient lake water. Thereafter, the mixed effluence 38 flows out the end of the conduit and into the lake water.

FIG. 1 has also been drawn to show that various forms of vegetable life 40–43 are growing unchecked, polluting the lake, and robbing the water of oxygen. Hence, an object of the invention is to pump an effluence from the lake, treat it, and then return it through the conduit 35 for either aerating or chemically treating the water. The oxygen introduced by aeration will enable animal life to return and restore the biological balance. The chemicals in the water may remove at least some of the plant life, fungus, parasites, or the like.

Figure 2:
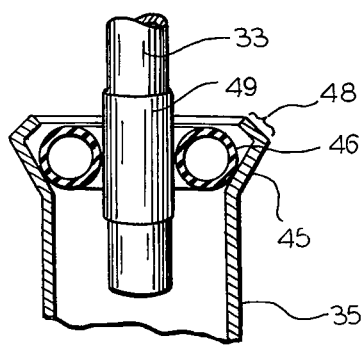
FIG. 2 is a cross-sectional view of a deflated water seal used in connection with the equipment in FIG. 1.
Figure 3:
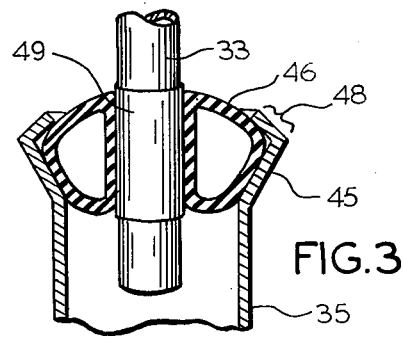
FIG. 3 is a cross-sectional view of the seal of FIG. 2 in an inflated condition.

The nature of the hose 33 to conduit 35 seal should become apparent from a study of FIGS. 2 and 3. In greater detail, the conduit terminates at its upper end in a funnel shaped opening 45 containing an inflatable sealing tube 46 constructed somewhat similar to an automobile inner tube. Thus, the output hose 33 may be slipped through the center of the deflated tube 46. Then, the sealing tube 46 is pumped, whereupon it seals itself around the output hose 33. To help maintain the seal, at least a section 49 of hose 33 preferably has a rigid perimeter. An inwardly turned edge 48 on the funnel opening 45 helps capture the inner tube 46 and to seal it to the hose 33. This way the conduit 35 may be either permanently mounted in the lake 31, or a temporarily installed device which may be carried on the truck 20 and then sealed to the hose 33, while in the lake.

It should now be apparent that the truck is driven to a suitable location. There, one end of the input hose 30 is connected to the mixing and treatment tank 26, and the other end is deposited in the lake. One end of the output hose 33 is connected to the manifold 32, and the other end is connected through the inflatable seal at the top of the conduit 35. The various engines, pumps, and generators are started, and the water is pumped from the lake, treated, and returned to the lake. The treatment process may be continued as long as necessary and repeated as desired.

Figure 4:
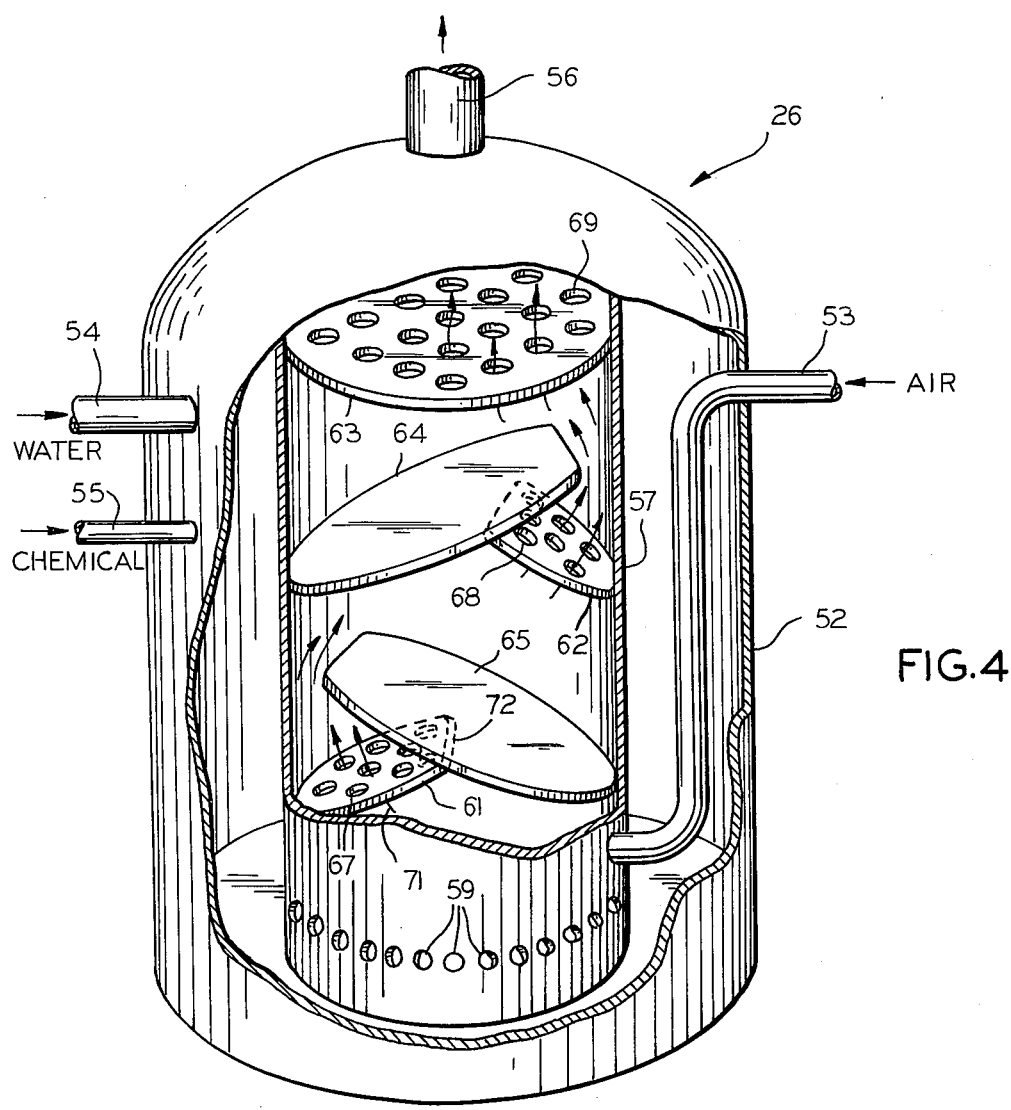
FIG. 4 is a perspective view of a mixing tank seen in FIG. 1 and partially broken away to disclose an internal baffle system.

The nature and construction of the treatment tank 26 should become more apparent from a study of FIG. 4. In greater detail, the tank 26 comprises an outer shell 52 having a mechanical strength adequate to withstand any internal pressures likely to be encountered during water treatment. Any suitable number of inlet pipes 53–55 provide means for introducing air, water, and chemicals into the shell 52. Outlet pipe 56 conveys the treated water out of the tank.

Inside the tank and co-axial with shell 52, there is an inner cylindrical housing member 57 for receiving the combination of air, water, and chemicals. More particularly, the top of cylindrical member 57 is welded or otherwise sealed to the top of the outer shell 52. The bottom of the cylindrical housing member 57 includes a number of inlets or ports 59 for receiving and transferring water and chemicals from shell 52 into the interior of cylindrical housing member 57. The air from inlet pipe 53 is introduced into cylindrical member 57 at a point above the ports 59. The various pressures and the tank and pipe geometry are arranged so that air from pipe 53 bubbles up inside cylindrical member 57 and does not blow back through ports 59.

Inside the cylindrical member 57 are a number of baffles 61, 62, 63 and deflector plates 64, 65 which define a tortious path for the treated water. Preferably, each baffle is a plate perforated by a suitable number of holes 67, 68, 69 sized and spaced so that mixing turbulances are created when water and air flow through them. Deflector plates 64, 65 guide and direct the stream of water 71 and air through the baffle plates via a tortious path. Preferably, these baffles and plates are angularly set, partial ellipses welded to each other at a flattened baffle end 72, and at their peripheries to the interior surfaces of the cylindrical member 57. A final mixing occurs responsive to the passage of the treated water through holes 69 in an upper baffle plate 63. From here, the treated water travels (FIG. 1) through outlet pipe 56 and hose 33 to conduit 35 and the freely turning turbine 37 which mixes the treated water with the ambient lake water.

Figure 5:
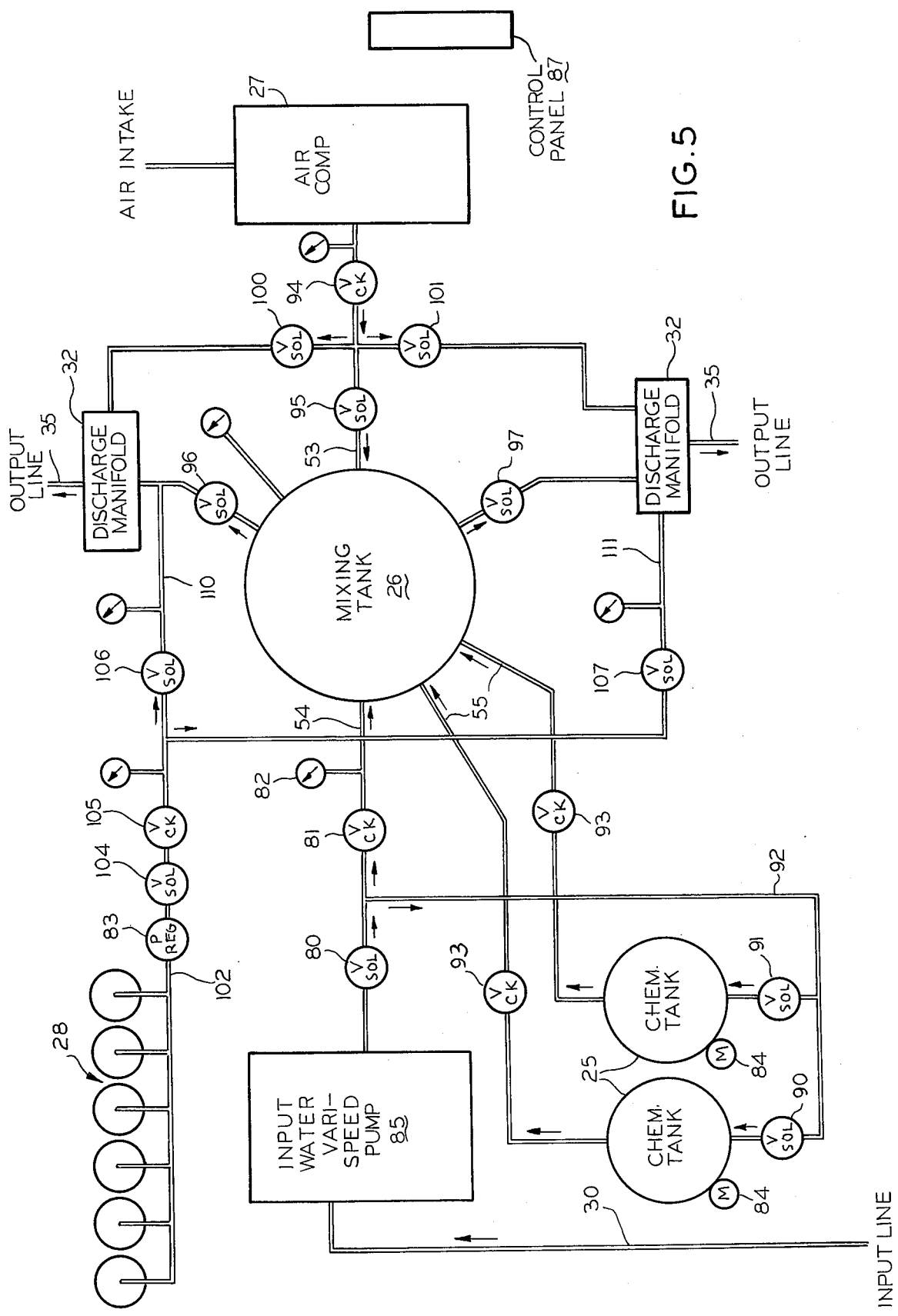
FIG. 5 is a schematic diagram of the piping circuit used to convey the water through the treatment equipment.

FIG. 5 schematically shows the fluid piping system which is used to treat the water. Many of the parts in this FIG. 5 also appear in FIGS. 1 and 4, where they are identified by the same reference numbers.

More specifically, FIG. 5 shows the mixing tank 26, chemical tanks 25, air compressor 27, and gas tanks 28. Various electrically controlled valves are shown by circles (as at 80) containing the notation "V SOL" (valve, solenoid). Check valves are shown by circles (as at 81) containing the notation "V CK" (valve, check). Pressure gauges are shown by circles containing needle indicating arrows (as at 82). A gas pressure regulator is shown by "P Reg" in a circle at 83. Motors 84 mix the ambient water and chemicals in the tanks 25. A variable speed motor driven pump combination 85 sucks water from the lake and pressurizes the system. Another motor driven pump combination may be provided, if required to pump the treated water back into the lake. A control panel 87 includes means for programming a sequence of events required by the system to adequately treat the water.

The system operates this way. Suitable controls are operated at panel 87 to program the various equipments and components in the system. The hoses 30, 33 are connected and placed in the lake. The engines are started in the motor driven generator combination 23, 24 and for the air compressor 27. The pump 85 sucks ambient water from the lake 31 via the hose 30. The solenoid valve 80 operates and lake water flows through check valves 81 and pipe 54 to the mixing tank 26. The chemical mixing motors 84 start, and solenoid valves 90, 91 open so that some of the lake water is drawn through tube 92 to one or more of the chemical tanks 25 where one or more chemicals are introduced and mixed by pumps 84 to make at least one concentrated solution. This solution flows through check valves 93, pipes 55 to the mixing tank 26. Air from compressor 27 flows through check valve 94, solenoid valve 95, and pipes 53 to the mixing tank 26. Inside the tank 26, the concentrated chemical solution, lake water, and air from compressor 27 are mixed, in the structure of FIG. 4.

Either one or both of the solenoid valves 96, 97 are opened and the treated water is pumped through at least one of the manifolds 32 and the outlet hoses 35 to the lake.

When it is desirable to treat the lake water with a gas, such as ozone, a suitable number of pressurized gas bottles 28 are connected to a line 102. A pressure regulator 83 maintains a constant line pressure. A solenoid valve 104 opens the gas line through check valve 105 where either one or both of the valves 106, 107 are operated to direct the gas through line 110, 111 to one or both of the manifolds 32 and conduits 35. Hence, it is seen that the inventive water treating system selectively provides means for treating water with air, chemicals, or gas. The program panel 87 may be fully automatic to perform each of a series of steps for predetermined periods of time so that the driver-operator has no discretion, and the degree of lake water treatment may be closely controlled by a responsible organization. Or, at the other extreme, the panel 87 may be completely under the control of the driver-operator to enable custom treatment of ambient water at each locality.

Since those skilled in the art will readily perceive modifications in the basic structure, the appended claims are to be construed to cover all equivalent structures falling within the scope and the spirit of the invention.

I claim:
1. A portable water treatment system,
said system mounted on an easily transportable vehicle,
said system including a double closed shell mixing tank having an inside shell within an outside shell, means for drawing ambient water into the outside shell of said tank, means for selectively introducing chemicals into said outside shell of said tank, means for drawing the ambient water and chemicals from the outside shell to the inside shell, means for selectively introducing air into the ambient water near the entrance to said inside shell, means for drawing fluids through the inside shell, means in the inside shell of said tank for thoroughly mixing said water and any of said air or chemicals introduced into said tank to treat said water, said means in the inside shell of said tank for thoroughly mixing said water and any of said air or chemicals introduced into said tank to treat said water including baffle means and deflector plates, said deflector plates positioned for directing a mixing stream of said treated water in a tortious path through said inside shell, said baffle means having a plurality of holes therein to agitate the water passing therethrough for mixing the water with chemicals and air, and said baffle means being positioned relative to said deflector plates so that water directed by deflector plates passes through said plurality of holes in the baffle means.

2. The system of claim 1 wherein said inside and outside shells are concentric cylindrical members sealed together at the tops thereof, said baffle means and deflector plates being partial ellipses welded to the inside of the housing member, and each said baffle means being biased and having one end welded to the bottom of one of said deflector plates and the other end welded to the inside of said inside shell.

3. The system of claim 1 wherein the means for mixing the treated water with ambient water comprises a conduit having a freely turning turbine mounted therein at one end thereof, and an inflatable seal at the other end thereof, and means for connecting a hose from said mixing means through said inflated seal to said conduit.

4. The system of claim 1 and means for programming the water treatment system to automatically perform each in a series of treatment steps for predetermined periods of time.

5. The system of claim 4 and means whereby said means for programming said water treatment comprises means for selectively mixing chemicals, air or gas with said water.

6. The system of claim 1 wherein said vehicle is a truck means, said system being a self-contained system carried by said truck means, and manifold means mounted on said truck and coupled to said means for returning said treated water to said ambient water whereby said truck may be driven to a treatment location and treated water may be returned through said manifold to any of many different locations.

7. A water treatment system for treating ambient water and to obtain treated water and for returning the treated water to the ambient water, comprising truck means, said system being a self-contained system carried by said truck means, manifold means mounted on said truck and coupled to means for returning said treated water to the ambient water whereby said truck may be driven to a treatment location and treated water may be returned through said manifold to ambient water at any of many different locations, a mixing tank, means for drawing ambient water into said tank, means for selectively introducing air or chemicals into said tank, means in said tank for thoroughly mixing said water and any of said air or chemicals introduced into said tank to treat said water, said tank comprising an outer shell and inner housing member, said outer shell being mounted on said truck, said shell and housing member being concentric cylindrical members sealed together at the top, said inner housing member having baffle and deflector plates positioned therein for directing a mixed stream of said water in a tortious path through said inner housing member, said baffle and deflector plates being partial ellipses welded at their peripheries to the inside of the housing member and to each other at ends thereof, said baffle plates having a plurality of holes therein through which said water must pass with turbulence while traveling over said tortious path, means for mixing said treated water with said ambient water as it is returned to said ambient water, the means for mixing the treated water with ambient water comprising a conduit having a turbine therein at one end thereof, an inflatable seal at the other end thereof, means for connecting a hose from said manifold means through said inflated seal to said conduit, means for programming the water treatment system to automatically perform each of a series of treatment steps for predetermined periods of time, and means whereby said means for programming water treatment comprises means for selectively mixing chemicals, air, or gas with said water.

* * * * *